(12) United States Patent
Li

(10) Patent No.: US 11,334,072 B2
(45) Date of Patent: May 17, 2022

(54) METHOD AND DEVICE FOR PLANNING VELOCITY OF A MOBILE APPARATUS

(71) Applicant: CLOUDMINDS (SHANGHAI) ROBOTICS CO., LTD., Shanghai (CN)

(72) Inventor: Lianzhong Li, Shenzhen (CN)

(73) Assignee: CLOUDMINDS (SHANGHAI) ROBOTICS CO., LTD., Shanghai (CN)

( * ) Notice: Subject to any disclaimer, the term of this patent is extended or adjusted under 35 U.S.C. 154(b) by 291 days.

(21) Appl. No.: 16/584,944

(22) Filed: Sep. 27, 2019

(65) Prior Publication Data

US 2020/0110409 A1  Apr. 9, 2020

(30) Foreign Application Priority Data

Oct. 9, 2018 (CN) .......................... 201811180854.7

(51) Int. Cl.
*G05D 1/00* (2006.01)
*G05D 1/02* (2020.01)

(52) U.S. Cl.
CPC ......... *G05D 1/0088* (2013.01); *G05D 1/0223* (2013.01)

(58) Field of Classification Search
CPC ...... G05D 1/0088; G05D 1/0223; G05D 1/00; G05D 1/02; G05D 1/021; G05D 1/0212
See application file for complete search history.

(56) References Cited

U.S. PATENT DOCUMENTS

| 2013/0131910 A1* | 5/2013 | Takahashi | G05D 1/0212 |
| | | | 701/27 |
| 2014/0188273 A1 | 7/2014 | Khoukhi et al. | |
| 2016/0169694 A1* | 6/2016 | Kobayashi | G01S 19/42 |
| | | | 701/25 |

FOREIGN PATENT DOCUMENTS

| CN | 101466111 A | 6/2009 |
| CN | 102645894 A | 8/2012 |

(Continued)

OTHER PUBLICATIONS

S. H. M. Amin and A. Adriansyah, "Particle Swarm Fuzzy Controller for Behavior-based Mobile Robot," 2006 9th International Conference on Control, Automation, Robotics and Vision, 2006, pp. 1-6, doi: 10.1109/ICARCV.2006.345293. (Year: 2006).*

(Continued)

*Primary Examiner* — Aniss Chad
*Assistant Examiner* — Christine Nguyen Huynh
(74) *Attorney, Agent, or Firm* — USCH Law, PC

(57) ABSTRACT

The present disclosure relates to a method, device, computer readable storage medium, and electronic device for planning velocity of a mobile apparatus. The method for planning velocity of a mobile apparatus provided by embodiments of the present disclosure comprises: acquiring a target weight coefficient according to a target linear velocity of the mobile apparatus; determining a motion central angle of the mobile apparatus according to a current pose, a target pose, and the target weight coefficient of the mobile apparatus; and calculating a target angular velocity of the mobile apparatus according to the motion central angle and the target linear velocity. The method for planning velocity of a mobile apparatus provided by embodiments of the present disclosure may realize real-time planning of velocity of the mobile apparatus to reach the target pose more accurately.

20 Claims, 3 Drawing Sheets

(56) References Cited

FOREIGN PATENT DOCUMENTS

| | | |
|---|---|---|
| CN | 104834308 A | 8/2015 |
| CN | 104898665 A | 9/2015 |
| CN | 106527432 A | 3/2017 |
| CN | 108021136 A | 5/2018 |

OTHER PUBLICATIONS

Cao, Mengmeng, "Dynamic Behavior Path Planning of Mobile Robot based on Fuzzy Logic Control," Master's Thesis, Beijing Jiaotong University, Feb. 15, 2010, 71 pgs.
Cloudminds (Shenzhen) Robotics Systems Co., Ltd., CN 201811180854.7, First Office Action (CN), dated Feb. 25, 2020, 13 pgs.

* cited by examiner

METHOD AND DEVICE FOR PLANNING VELOCITY OF A MOBILE APPARATUS

CROSS-REFERENCE TO RELATED APPLICATION

This application claims the priority benefit of Chinese Patent Application No. 201811180854.7 filed on Oct. 9, 2018 and entitled "Method and Device for Planning Velocity of a Mobile Apparatus," the disclosure of which is incorporated by reference herein in its entirety.

TECHNICAL FIELD

The present disclosure relates to the field of motion control technologies, and in particular, to a method for planning velocity of a mobile apparatus, a device for planning velocity of a mobile apparatus, a computer readable storage medium, and an electronic apparatus.

BACKGROUND

For a security patrol robot, the motion thereof is generally a tracing motion, that is, a planning path is known in advance and the robot cruises along a fixed trajectory. The type of the security patrol robot generally comprises a forward-turn rear-drive type (that is, the rear wheels are responsible for driving, the front wheels are responsible for steering, and the robot is more agile when steering). The robot has a feature that an origin turning cannot be achieved, and it is considered to have a circular motion in a small $\Delta t$, which means that the robot cannot move strictly on its planned path.

The general practice is to discretize the planned trajectory into a series of target points, and the robot realizes the tracing by traversing all the target points, and the problem of tracing the robot becomes a problem of moving from the current state to the next target point.

Both the current state and the target state of the robot have two dimensions, namely position and attitude. If the steering radius of the robot is large and the robot is close to the target point, it is almost impossible that the robot completely reaches the target position and the target attitude through a circular motion.

It should be noted that the information disclosed in the Background section above is only used for better understanding of the background of the present disclosure, and thus it may comprise information that does not constitute prior art known to those skilled in the art.

SUMMARY

It is an object of the present disclosure to provide a method for planning velocity of a mobile apparatus, a device for planning velocity of a mobile apparatus, a computer readable storage medium, and an electronic apparatus, thereby solving at least to some extent the technical problem that the mobile apparatus cannot reach the target pose more accurately due to limitations of the related art.

According to an aspect of the present disclosure, there is provided a method for planning velocity of a mobile apparatus comprising: acquiring a target weight coefficient according to a target linear velocity of the mobile apparatus; determining a motion central angle of the mobile apparatus according to a current pose, a target pose, and the target weight coefficient of the mobile apparatus; and calculating a target angular velocity of the mobile apparatus according to the motion central angle and the target linear velocity.

In an exemplary embodiment of the present disclosure, acquiring a target weight coefficient according to a target linear velocity of the mobile apparatus comprises: establishing a fuzzy controller for motion of the mobile apparatus; inputting the target linear velocity to the fuzzy controller; and outputting the target weight coefficient by the fuzzy controller according to the target linear velocity.

In an exemplary embodiment of the present disclosure, establishing a fuzzy controller for motion of the mobile apparatus comprises: setting a linear velocity level and a linear velocity fuzzy set of the mobile apparatus; setting a weight coefficient level and a weight coefficient fuzzy set of the mobile apparatus; and acquiring a fuzzy relationship between a linear velocity membership degree and a weight coefficient membership degree according to the linear velocity level, the linear velocity fuzzy set, the weight coefficient level, and the weight coefficient fuzzy set.

In an exemplary embodiment of the present disclosure, acquiring a fuzzy relationship between a linear velocity membership degree and a weight coefficient membership degree, according to the linear velocity level, the linear velocity fuzzy set, the weight coefficient level, and the weight coefficient fuzzy set comprises: determining a linear velocity membership degree function according to the linear velocity level and the linear velocity fuzzy set; determining a weight coefficient membership degree function according to the weight coefficient level and the weight coefficient fuzzy set; calculating, according to the linear velocity membership degree function, the linear velocity membership degree of the linear velocity level to each of elements of the linear velocity fuzzy set, respectively; calculating, according to the weight coefficient membership degree function, the weight coefficient membership degree of the weight coefficient level to each of elements of the weight coefficient fuzzy set, respectively; acquiring the fuzzy relationship between the linear velocity membership degree and the weight coefficient membership degree according to the linear velocity membership degree of the linear velocity level to each of the elements of the linear velocity fuzzy set and the weight coefficient membership degree of the weight coefficient level to each of the elements of the weight coefficient fuzzy set.

In an exemplary embodiment of the present disclosure, the linear velocity fuzzy set is represented by $V=\{VS_v, S_v, M_v, F_v, VF_v\}$, the weight coefficient fuzzy set is represented by $A=\{VS_\alpha, S_\alpha, M_\alpha, B_\alpha, VB_\alpha\}$; and establishing a fuzzy controller for motion of the mobile apparatus further comprises:

Making a fuzzy rule according to the linear velocity fuzzy set and the weight coefficient fuzzy set as follows: If $V=VS_v$, then $A=VS_\alpha$; If $V=S_v$, then $A=S_\alpha$; If $V=M_v$, then $A=M_\alpha$; If $V=F_v$, then $A=B_\alpha$; If $V=VF_v$, then $A=VB_\alpha$.

In an exemplary embodiment of the present disclosure, the outputting the target weight coefficient by the fuzzy controller according to the target linear velocity comprises: acquiring a membership degree of the target linear velocity to the linear velocity fuzzy set according to the linear velocity membership degree function; acquiring a membership degree of the target weight coefficient according to the fuzzy relationship and the membership degree of the target linear velocity to the linear velocity fuzzy set; and defuzzying the membership degree of the target weight coefficient according to a maximum membership degree principle to acquire the target weight coefficient.

In an exemplary embodiment of the present disclosure, the current pose comprises a current position S and a current attitude angle $\theta_0$ of the mobile apparatus; the target pose comprises a target position G and a target attitude angle $\theta_g$ of the mobile apparatus.

In an exemplary embodiment of the present disclosure, the motion central angle $\theta$ of the mobile apparatus is determined according to the following formula:

$$\theta=\alpha(\theta_g-\theta_0)+(1-\alpha)(\theta_1-\theta_0)$$

In the above formula, $\alpha$ denotes the target weight coefficient; $\theta_1$ denotes a tangent attitude angle of a circle O and the target position G, wherein the circle O passes through both the current position S and the target position G and is tangent to the current attitude angle $\theta_0$.

In an exemplary embodiment of the present disclosure, the calculating a target angular velocity of the mobile apparatus according to the motion central angle and the target linear velocity comprises: acquiring a radius of a circle for the motion of the mobile apparatus according to the motion central angle and a distance between the current position and the target position; and acquiring the target linear velocity according to the radius and the target linear velocity.

In an exemplary embodiment of the present disclosure, the method further comprises: sending the target linear velocity and the target angular velocity to a control unit of the mobile apparatus at a set frequency, such that the mobile apparatus moves from the current position to the target position according to the target linear velocity and the target angular velocity.

In an exemplary embodiment of the present disclosure, the mobile apparatus is a forward-turn rear-drive robot.

According to an aspect of the present disclosure, there is provided a device for planning velocity of a mobile apparatus comprising: a target weight coefficient acquiring module configured to acquire a target weight coefficient according to a target linear velocity of the mobile apparatus; a motion central angle determining module configured to determine a motion central angle of the mobile apparatus according to a current pose, a target pose, and the target weight coefficient of the mobile apparatus; and a target angular velocity calculating module angular configured to calculate a target angular velocity of the mobile apparatus according to the motion central angle and the target linear velocity.

According to an aspect of the present disclosure, there is provided a computer readable storage medium having stored thereon a computer program, when executed by a processor, the computer program implements the method for planning velocity of a mobile apparatus according to any of the above.

According to an aspect of the present disclosure, there is provided an electronic device comprising: a processor; a memory for storing executable instructions of the processor; wherein the processor is configured to implement the method for planning velocity of a mobile apparatus according to any of the above via execution of the executable instructions.

The method for planning velocity of a mobile apparatus according to embodiments of the present disclosure acquires a target weight coefficient by a target linear velocity of the mobile apparatus, determines a motion central angle of the mobile apparatus according to a current pose, a target pose, and the target weight coefficient of the mobile apparatus, and then calculates a target angular velocity of the mobile apparatus according to the motion central angle and the target linear velocity, such that two constraints of both the target position and the target attitude of the target point to which the mobile apparatus is to move are considered comprehensively, enabling a real-time planning of the velocity of the mobile apparatus, thereby the mobile apparatus reaches the target location and the target attitude approximately.

It will be understood that the above general description and the following detailed description are intended to be illustrative and not restrictive.

BRIEF DESCRIPTION OF THE DRAWINGS

The accompanying drawings, which are incorporated in and constitute a part of this specification, illustrate embodiments of the present disclosure and together with the description, serve to explain the principles of the present disclosure. It is obvious to those skilled in the art that the drawings in the following description are only some embodiments of the present disclosure, and other drawings may be acquired from these drawings without any creative work.

DETAILED DESCRIPTION

Figure 1:
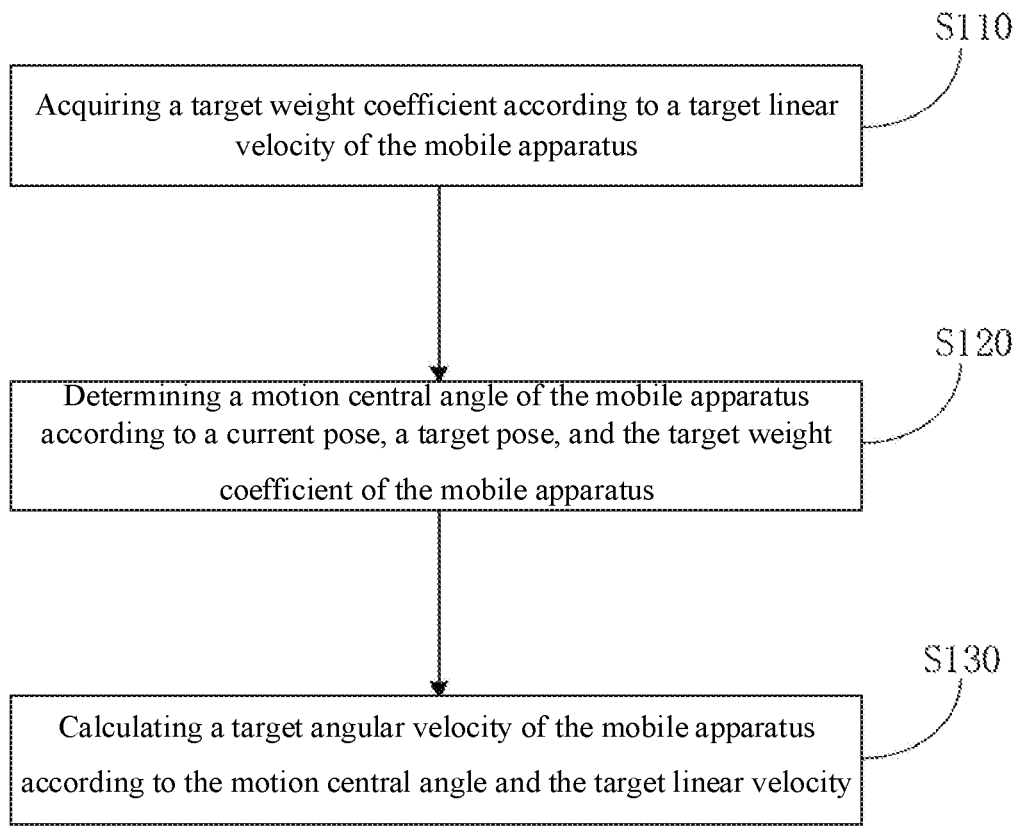
FIG. 1 is a flow chart schematically illustrating a method for planning velocity of a mobile apparatus according to an exemplary embodiment of the present disclosure.

Example embodiments will be described more comprehensively hereinafter with reference to the accompanying drawings. However, the example embodiments can be embodied in a variety of forms and should not be construed as being limited to the examples set forth herein; rather, these embodiments are provided such that this disclosure will be more comprehensive and complete, and the idea of the example embodiments will be comprehensively conveyed to those skilled in the art. The described features, structures, or characteristics may be combined in any suitable manner in one or more embodiments.

The drawings are only schematic representations of the present disclosure, and are not necessarily to be drawn to scale. The same reference numerals in the drawings denote the same or similar parts, and the repeated description thereof will be omitted. Some of the block diagrams shown in the drawings are functional, entities, which do not have to correspond to physically or logically separated entities. These functional entities may be implemented in the form of software, or implemented in one or more hardware modules or integrated circuits, or implemented in different network and/or processor devices and/or microcontroller devices.

FIG. 1 is a flow chart schematically illustrating a method for planning velocity of a mobile apparatus according to an exemplary embodiment of the present disclosure.

As shown in FIG. 1, a method for planning velocity of a mobile apparatus provided by an embodiment of the present disclosure may comprise the following steps.

In step S110, acquiring a target weight coefficient according to a target linear velocity of the mobile apparatus.

In an exemplary embodiment, acquiring a target weight coefficient according to a target linear velocity of the mobile apparatus may further comprise: establishing a fuzzy controller for motion of the mobile apparatus; inputting the target linear velocity to the fuzzy controller; outputting the target weight coefficient by the fuzzy controller according to the target linear velocity.

In an exemplary embodiment, establishing a fuzzy controller for motion of the mobile apparatus may further comprise: setting a linear velocity level and a linear velocity fuzzy set of the mobile apparatus; setting a weight coefficient level and a weight coefficient fuzzy set of the mobile apparatus; acquiring a fuzzy relationship between a linear velocity membership degree and a weight coefficient membership degree according to the linear velocity level, the linear velocity fuzzy set, the weight coefficient level, and the weight coefficient fuzzy set.

In an exemplary embodiment, acquiring a fuzzy relationship between a linear velocity membership degree and a weight coefficient membership degree according to the linear velocity level, the linear velocity fuzzy set, the weight coefficient level, and the weight coefficient fuzzy set may further comprise: determining a linear velocity membership degree function according to the linear velocity level and the linear velocity fuzzy set; determining a weight coefficient membership degree function according to the weight coefficient level and the weight coefficient fuzzy set; calculating, according to the linear velocity membership degree function, the linear velocity membership degree of the linear velocity level to each of elements in the linear velocity fuzzy set, respectively; calculating, according to the weight coefficient membership degree function, the weight coefficient membership degree of the weight coefficient level to each of elements in the weight coefficient fuzzy set, respectively; and acquiring the fuzzy relationship between the linear velocity membership degree and the weight coefficient membership degree, according to the linear velocity membership degree of the linear velocity level to each of the elements in the linear velocity fuzzy set and the weight coefficient membership degree of the weight coefficient level to each of the elements in the weight coefficient fuzzy set.

In an exemplary embodiment the linear velocity fuzzy set is represented by $V=\{VS_v, S_v, M_v, F_v, VF_v\}$, and the weight coefficient fuzzy set is represented by $A=\{VS_\alpha, S_\alpha, M_\alpha, B_\alpha, VB_\alpha\}$.

In an exemplary embodiment, establishing a fuzzy controller for motion of the mobile apparatus may further comprise: making a fuzzy rule according to the linear velocity fuzzy set and the weight coefficient fuzzy set as follows:

If $V=VS_v$, then $A=VS_\alpha$;
If $V=S_v$, then $A=S_\alpha$;
If $V=M_v$, then $A=M_\alpha$;
If $V=F_v$, then $A=B_\alpha$;
If $V=VF_v$, then $A=VB_\alpha$.

In an exemplary embodiment, outputting the target weight coefficient by the fuzzy controller according to the target linear velocity may further comprise: acquiring a membership degree of the target linear velocity to the linear velocity fuzzy set according to the linear velocity membership degree function; acquiring a membership degree of the target weight coefficient according to the fuzzy relationship and the membership degree of the target linear velocity to the linear velocity fuzzy set; defuzzying the membership degree of the target weight coefficient according to a maximum membership degree principle to acquire the target weight coefficient.

In step S120, determining a motion central angle of the mobile apparatus according to a current pose, a target pose, and the target weight coefficient of the mobile apparatus.

In an exemplary embodiment, the current pose may comprise a current position S and a current attitude angle $\theta_0$ of the mobile apparatus; and the target pose may comprise a target position G and a target attitude angle $\theta_g$ of the mobile apparatus.

In an exemplary embodiment, the motion central angle $\theta$ of the mobile apparatus may be determined according to the following formula:

$$\theta=\alpha(\theta_g-\theta_0)+(1-\alpha)(\theta_1-\theta_0) \qquad (1)$$

In the above formula (1), $\alpha$ denotes the target weight coefficient; $\theta_1$ denotes a tangent attitude angle of a circle O and the target position G, wherein the circle O passes through both the current position S and the target position G and is tangent to the current attitude angle $\theta_0$.

In step S130, calculating a target angular velocity of the mobile apparatus according to the motion central angle and the target linear velocity.

In an exemplary embodiment, the calculating a target angular velocity of the mobile apparatus according to the motion central angle and the target linear velocity may further comprise: acquiring a radius of a circular for the motion of the mobile apparatus according to a distance between the current position and the target position and the motion central angle; acquiring a target linear velocity according to the radius and the target linear velocity.

In an exemplary embodiment, the method may further comprise: sending the target linear velocity and the target angular velocity to a control unit of the mobile apparatus at a set frequency, such that the mobile apparatus moves from the current position to the target position according to the target linear velocity and the target angular velocity.

In an exemplary embodiment, the mobile apparatus may be a forward-turn rear-drive robot.

It should be noted that, in the embodiment of the present disclosure, the robot may be any one of a security robot, a security patrol robot, a service robot, and the like. In other embodiments, the mobile apparatus may be any forward-turn rear-drive type mobile apparatus such as an unmanned vehicle, but the present disclosure is not limited thereto. In the following embodiments, a forward-turn rear-drive type robot is taken as an example.

The method for planning velocity of a mobile apparatus according to embodiments of the present disclosure acquires a target weight coefficient according to a target linear velocity of the mobile apparatus, determines a motion central angle of the mobile apparatus according to a current pose, a target pose and the target weight coefficient of the mobile apparatus, and then calculates a target angular velocity of the mobile apparatus according to the motion central angle and the target linear velocity, such that two constraints about a target position and a target attitude of the target point to which the mobile apparatus is supposed to move are considered comprehensively, enabling a real-time planning of the velocity of the mobile apparatus, thereby the mobile apparatus reaches the target location and the target attitude approximately.

The above described method for planning velocity of a mobile apparatus provided by the embodiment of the present disclosure is illustrated below with reference to FIGS. 2-4, but the present disclosure is not limited thereto.

The embodiment of the present disclosure solves the problem of velocity planning for a forward-turn rear-drive robot, and proposes a method for planning velocity of the robot based on fuzzy logic and low-pass filtering, that is, when the current position and current attitude of the robot and the target position and the target attitude of the next target point is known, the linear velocity and angular velocity of the robot are planned in real time. The planning process may comprise the following steps: determining a current pose and a target pose of the robot; calculating a target weight coefficient $\alpha_0$ according to the current pose and the target pose by using fuzzy logic; calculating a motion central angle $\theta$ of the robot according to the target weight coefficient $\alpha_0$ by using a low-pass filtering algorithm; calculating a steering radius of the robot according to the motion central angle $\theta$; and planning a target angular velocity of the robot according to the steering radius.

In the embodiment of the present disclosure, a first-order low-pass filtering algorithm may be adopted to calculate the motion central angle $\theta$ of the robot, but the present disclosure is not limited thereto.

The principle of the first-order low-pass filtering is that the first-order low-pass filtering is adopted to implement a function of a general hardware RC low-pass filter by using software programming, and the algorithm formula of the first-order low-pass filtering is:

$$Y(n)=\alpha X(n)+(1-\alpha)Y(n-1) \quad (2)$$

In the above formula (2), $\alpha$ denotes a filter coefficient, $X(n)$ denotes the current sampling value, $Y(n-1)$ denotes an output value in the last filtering, and $Y(n)$ an output value of the current filtering. The first-order low-pass filtering uses the current sampling and the last filtering output value to weight, and acquires an effective filtering value, that is, the output value of the current filtering.

Figure 2:
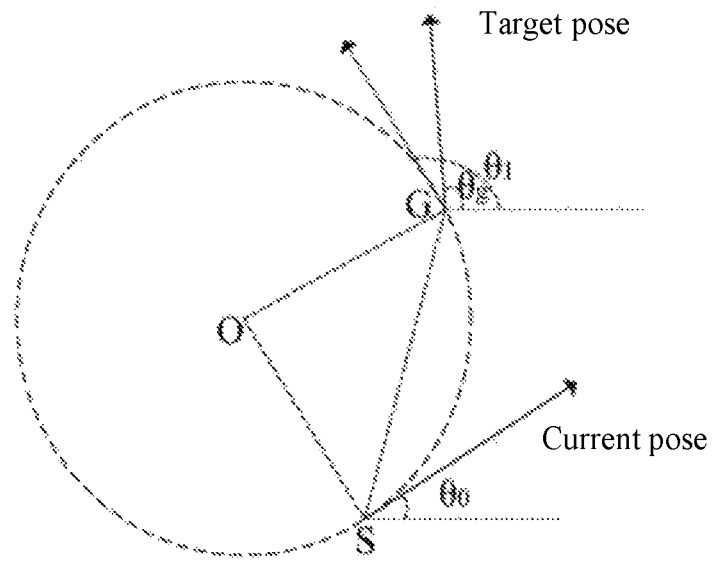
FIG. 2 is a diagram schematically illustrating a method for planning velocity of a mobile apparatus according to an exemplary embodiment of the present disclosure.

In the embodiment of the present disclosure, the basic principle of the method for planning velocity of a robot based on the first-order low-pass filtering is shown in FIG. 2, and the following assumption is made: the current position of the robot is represented by S, the current attitude angle is represented by $\theta_0$, the target position is represented by G, and the target attitude angle is represented by $\theta_g$; and the circle O passes through both the point S and G and is tangent to the current attitude of the robot, wherein, the attitude angle $\theta_1$ is tangent to the circle O by passing through the point G.

If only the position is considered, the robot just needs to move along the circumference formed by the central angle $(\theta_1-\theta_0)$ to reach the target position G, but it cannot ensure that the target attitude $\theta_g$ is reached; and if only the attitude is considered, the robot just needs to move along the circumference formed by the central angle $(\theta_g-\theta_0)$ to reach the attitude $\theta_g$, but it cannot ensure that the target position G is reached.

In the embodiment of the present disclosure, in order to comprehensively consider two constraints of the target position and the target attitude, the idea of low-pass filtering control method is introduced here, and the central angle of the desired motion $(\theta_1-\theta_0)$ is used as the output value of the last filtering, the difference between the target attitude angle and the current attitude angle $(\theta_g-\theta_0)$ is used as the current sampling value, then the motion central angle $\theta$ of the robot generated based on the low-pass filtering is calculated according to the following formula:

$$\theta=\alpha(\theta_g-\theta_0)+(1-\alpha)(\theta_1-\theta_0)$$

Wherein, $\alpha \in [0, 1]$ is related to the operating linear velocity of the robot.

In the embodiment of the present disclosure, there is an unknown number a in the above formula, which determines weights of the two constraints of the target position and the target posture.

In the embodiment of the present disclosure, it may be assumed that the spacing between two adjacent discrete target points is equal when planning the path of the robot, and the greater the linear velocity of the robot is, the fewer times the attitude of the robot is updated. At this time, a greater weight is given to the attitude angle so as to be closer to the target attitude angle.

In the embodiment of the present disclosure, in order to make the algorithm have better applicability to different operating linear velocity of the robot, a fuzzy logic method is introduced here for optimizing the filter coefficient $\alpha$.

In the embodiment of the present disclosure, in the fuzzy logic method, the operating linear velocity $v_0$ of the robot is taken as an input parameter (i.e., the target linear velocity), and the variation range of the linear velocity v is defined as a basic domain on the linear velocity fuzzy set, that is, the linear velocity level is: $v=(v_1, v_2, \ldots, v_m)$, where m is a positive integer greater than or equal to 1, and the value of m may be set according to a specific application scenario, it is assumed here that m=5.

It should be noted that the value of m and the interval between two adjacent linear velocity levels may be different according to the application scenario. For example, the linear velocity of the security robot is relatively slow, and thus the interval between two adjacent linear velocity levels may be set to be relatively small; and the linear velocity of the unmanned vehicle is relatively fast, and thus the interval between two adjacent linear velocity levels may be set to be relatively large. In addition, the interval between two forward adjacent linear velocity levels in the front may be set to be small, and as the linear velocity becomes faster, the interval between two adjacent linear velocity levels may be set to be large. For example, in the following table that takes the robot as an example, the interval between two adjacent linear velocity levels is changed from 0.2 m/s to 0.3 m/s, and from 0.3 m/s to 0.5 m/s.

wherein, the greater the number of m is, the finer the change in the linear velocity and the value of $\alpha$ is.

In the embodiment of the present disclosure, the linear velocity fuzzy set of the robot may be defined as {Very Slow ($VS_v$), Slow ($S_v$), Medium ($M_v$), Fast ($F_v$), Very Fast ($VF_v$)}, but the present disclosure is not limited thereto, and the definition is only used for illustration. The definition of a specific linear velocity fuzzy set may be independently designed according to the actual application scenario.

Wherein, the linear velocity membership degree function may be determined according to the set linear velocity level and the linear velocity fuzzy set. In the embodiment of the present disclosure, a linear membership degree function may be adopted for the linear velocity membership degree function. FIG. 3 is a diagram schematically illustrating a linear velocity membership degree function according to an exemplary embodiment of the present disclosure. Where, v1, v2, v3, v4, and v5 are the first point, the second point, the third point, the fourth point, and the fifth point intersecting with the abscissa in FIG. 3, respectively.

Figure 3:
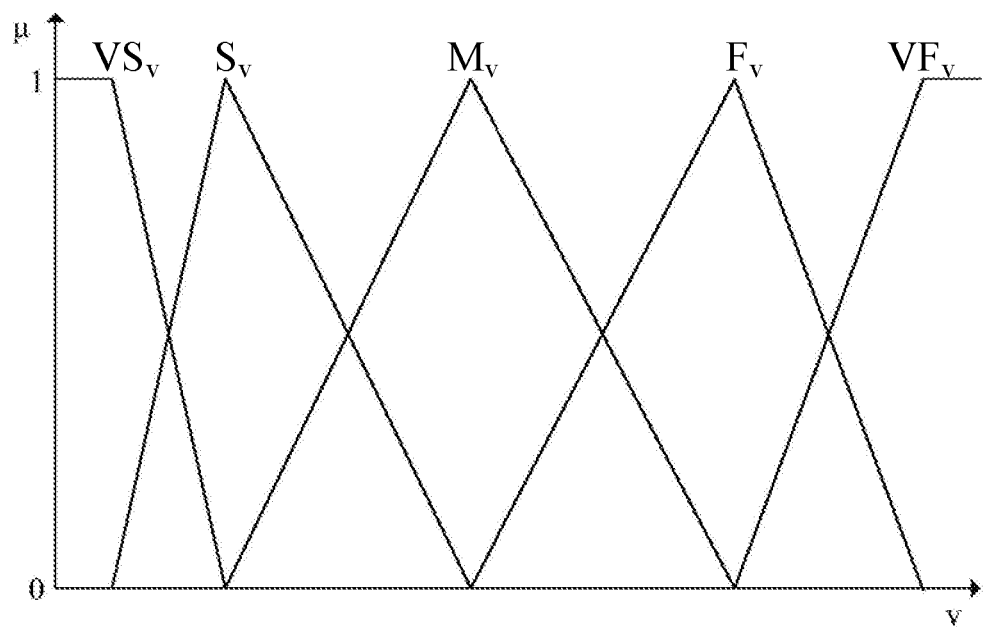
FIG. 3 is a diagram schematically illustrating a linear velocity membership degree function according to an exemplary embodiment of the present disclosure.

As shown in FIG. 3, the membership degree function of the linear velocity v to the linear velocity fuzzy set V={$VS_v$, $S_v$, $M_v$, $F_v$, $VF_v$} may be expressed as:

$$\xi = {}^{V_i}\mu(v). \quad (3)$$

where i=1, 2, . . . , m. Assuming that m=5 here, then i=i=1, 2, . . . , 5, Vi represents the i-th element in the linear velocity fuzzy set.

In the embodiment of the present disclosure, the weight coefficient $\alpha_0$ is taken as an output parameter (ie, the target weight coefficient), and the variation range thereof is defined as a domain on the weight coefficient fuzzy set, that is, the authority coefficient level: A=($\alpha_1$, $\alpha_2$, . . . , $\alpha_m$), and the fuzzy set of a may be defined as {Very Small ($VS_\alpha$), Small ($S_\alpha$), Medium ($M_\alpha$), Big ($B_\alpha$), Very Big ($VB_\alpha$)}, but the present disclosure is not limited thereto, and the definition is only used for illustration. The definition of a specific weight coefficient fuzzy set may be independently designed according to the actual application scenario.

Wherein, the weight coefficient membership degree function may be determined according to the set weight coefficient level and the weight coefficient fuzzy set. In the embodiment of the present disclosure, a linear membership degree function may be adopted for the weight coefficient membership degree function FIG. 4 is a diagram schematically illustrating a weight coefficient membership degree function according to an exemplary embodiment of the present disclosure. Wherein, $\alpha_1$, $\alpha_2$, $\alpha_3$, $\alpha_4$, and $\alpha_5$ represent the first point, the second point, the third point, the fourth point, and the fifth point intersecting with the abscissa in FIG. 4, respectively.

Figure 4:
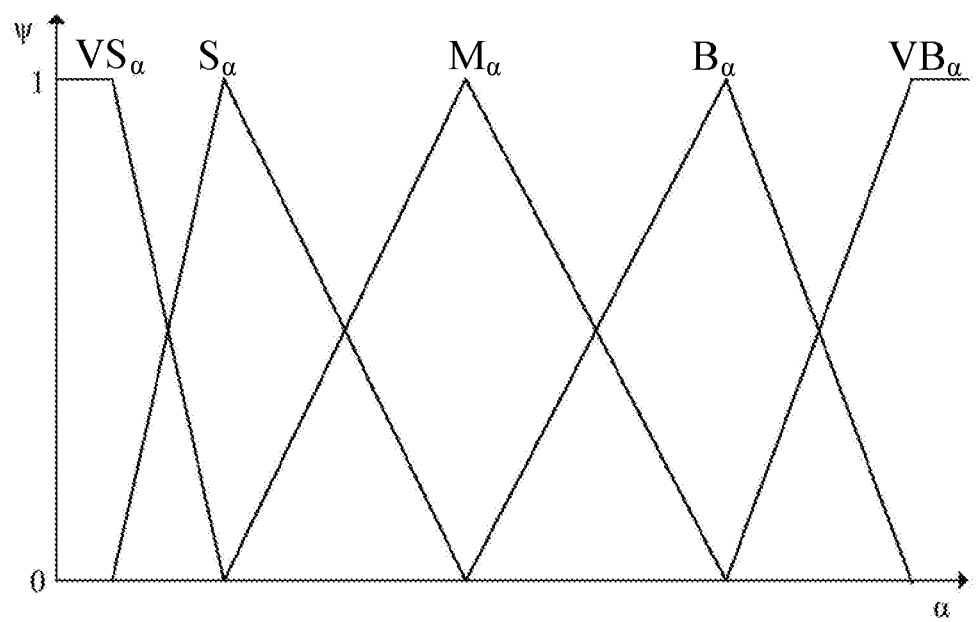
FIG. 4 is a diagram schematically illustrating a weight coefficient membership degree function according to an exemplary embodiment of the present disclosure.

As shown in FIG. 4, the membership degree of the weight coefficient α to the weight coefficient fuzzy set A={$VS_\alpha$, $S_\alpha$, $M_\alpha$, $B_\alpha$, $VB_\alpha$} may be expressed as:

$$\xi = {}^{A_i}\psi(\alpha) \quad (4)$$

where i=1, 2, . . . , m. Assuming herein that m=5, then i=i=1, 2, . . . , 5, Ai represents the i-th element of the weighs coefficient fuzzy set.

It should be noted that although the membership degree functions of FIG. 3 and FIG. 4 all adopt a linear membership degree function, the present disclosure is not limited thereto, and in other embodiments, a nonlinear membership degree function may also be adopted.

In the embodiment of the present disclosure, it is desirable that the greater the operating linear velocity of the robot is, the larger the acquired weight coefficient is, so the following fuzzy rule may be made, as shown in Table 1:

TABLE 1

| | fuzzy rules | | | | |
|---|---|---|---|---|---|
| If(V) | $VS_v$ | $S_v$ | $M_v$ | $F_v$ | $VF_v$ |
| Then(A) | $VS_\alpha$ | $S_\alpha$ | $M_\alpha$ | $B_\alpha$ | $VB_\alpha$ |

In the embodiment of the present disclosure, assuming that m=5, then the fuzzy relationship R may be defined as:

$$R = \bigcup_{i=1}^{5} R_i \quad (5)$$

wherein, $R_i = {}^{v_i}\xi_v^T \cdot {}^{i}\xi_\alpha$; ${}^{i}\xi_v = [{}^{V_i}\mu(v_1), \ldots, {}^{V_i}\mu(v_m)]$ represents the membership degree of the basic domain of the linear velocity value range to the i-th element $V_i$ of the linear velocity fuzzy set V; ${}^{i}\xi_v^T$ represents the transpose of ${}^{i}\xi_v$; ${}^{i}\zeta_\alpha = [{}^{A_i}\psi(\alpha_1), \ldots, {}^{A_i}\psi(\alpha_m)]$ represents the membership degree of the basic domain of the weight coefficient value range of the i-th element $A_i$ to the weight coefficient fuzzy set A.

wherein, R is the union of $R_1$, $R_2$, $R_3$, $R_4$, $R_5$, for example, assuming that $R_i$ is a 5*5 matrix, then in the same position, the maximum of $R_1$, $R_2$, $R_3$, $R_4$, $R_5$ is taken as the element value of R in a corresponding position.

For example, assuming that:

$$
{}^{1}\xi_v^T \cdot {}^{1}\zeta_\alpha = \begin{bmatrix} 1 \\ 0.5 \\ 0 \\ 0 \\ 0 \end{bmatrix} [1 \ 0.5 \ 0 \ 0 \ 0] = \begin{bmatrix} 1 & 0.5 & 0 & 0 & 0 \\ 0.5 & 0.5 & 0 & 0 & 0 \\ 0 & 0 & 0 & 0 & 0 \\ 0 & 0 & 0 & 0 & 0 \\ 0 & 0 & 0 & 0 & 0 \end{bmatrix} \quad (6)
$$

$$
R = \begin{bmatrix} 1 & 0.5 & 0 & 0 & 0 \\ 0.5 & 0.5 & 0.5 & 0.5 & 0 \\ 0 & 0.5 & 1 & 0.5 & 0 \\ 0 & 0.5 & 0.5 & 0.5 & 0.5 \\ 0 & 0 & 0 & 0.5 & 1 \end{bmatrix} \quad (7)
$$

In the embodiment of the present disclosure, assuming that the operating linear velocity of the robot is $v_0$ (i.e., the target linear velocity). According to the linear velocity membership degree function described above, the membership degree of the target linear velocity $v_0$ to the linear velocity fuzzy set V is calculated as follows:

$$\xi_{v_0} = [{}^{VS_v}\mu(v_0), {}^{S_v}\mu(v_0), {}^{M_v}\mu(v_0), {}^{F_v}\mu(v_0), {}^{VF_v}\mu(v_0)] \quad (8)$$

According to the fuzzy relationship, the membership degree of the target weight coefficient $\alpha_0$ to the weight coefficient fuzzy set A is:

$$\zeta_{\alpha_0} = \xi_{v_0} \cdot R \quad (9)$$

The membership degree $\zeta_{\alpha_0}$ of the target weight coefficient to the weight coefficient fuzzy set is acquired according to the above formula, that is, if the ordinate value in FIG. 4 is known, an intersection point of each triangle in the weight coefficient membership degree function of FIG. 4 may be acquired, as the abscissa value. As can be seen from FIG. 4, when the ordinate is known, the values of the plurality of abscissas may be acquired. At this time, the maximum value in the above abscissas may be taken as the final target weight coefficient $\alpha_0$ according to the maximum membership degree principle.

In the embodiment of the present disclosure, according to the maximum membership degree principle, the membership degree g of the target weight coefficient to the weight coefficient fuzzy set is anti-fuzzied (that is, defuzzied), so as to acquire the target weight coefficient $\alpha_0$:

$$\alpha_0 = \psi^{-1}(\xi_{\alpha_0}) \quad (10)$$

Substituting the acquired target weight coefficient $\alpha_0$ into the above formula (1), the motion central angle θ of the robot is acquired as follows:

$$\theta = \alpha_0(\theta_g - \theta_0) + (1 - \alpha_0)(\theta_1 - \theta_0) \quad (11)$$

In the embodiment of the present disclosure, it is assumed that the chord length of the circular for the motion of the robot with a central angle θ is a linear distance:

$$d = |SG| \quad (12)$$

The radius of the circular for the motion of the robot is:

$$r=(d/2)/\sin(\theta/2) \qquad (13)$$

Assuming that the linear velocity of the robot at time t is v(t), then the angular velocity ω(t) at time t is:

$$\omega(t)=v(t)/r \qquad (14)$$

So far, the angular velocity of the robot is acquired, and [v, ω] is transmitted to a control unit of the robot at a certain frequency, such that the robot can move along the planned trajectory.

For example, assuming that the desired motion trajectory of the robot is a curve 1, a series of separated target points $G_1$, $G_2$, $G_3$, . . . are presented in the curve 1 at a certain distance interval, and the tangential direction of the curve 1 at the target point is the target attitude of the robot; the target position is $G_i$, the attitude angle is $\theta_{gi}$, the current position is S, the attitude angle is $\theta_0$, the attitude angle that is tangent to the circle $O_i$ at point $G_i$ is $\theta_{1i}$.

It is assumed here that the v-linear velocity variation of the robot is divided into nine levels: 0.2 m/s, 0.4 m/s, 0.6 m/s, 0.8 m/s, 1.0 m/s, 1.2 m/s, 1.5 m/s, 2.0 m/s and 2.5 m/s, and the fuzzy table of the membership degree function of the linear velocity v on the linear velocity fuzzy set V is shown in table 2:

TABLE 2

(linear velocity levels and their fuzzy sets)

| membership degree | | velocity level | | | | | | | | |
|---|---|---|---|---|---|---|---|---|---|---|
| | | 0.2 | 0.4 | 0.6 | 0.8 | 1.0 | 1.2 | 1.5 | 2.0 | 2.5 |
| fuzzy set | $VS_v$ | 1.0 | 0.5 | 0 | 0 | 0 | 0 | 0 | 0 | 0 |
| | $S_v$ | 0 | 0.5 | 1.0 | 0.5 | 0 | 0 | 0 | 0 | 0 |
| | $M_v$ | 0 | 0 | 0 | 0.5 | 1.0 | 0.5 | 0 | 0 | 0 |
| | $F_v$ | 0 | 0 | 0 | 0 | 0 | 0.5 | 1.0 | 0.5 | 0 |
| | $VF_v$ | 0 | 0 | 0 | 0 | 0 | 0 | 0 | 0.5 | 1.0 |

It is further assumed that the variation of the weight coefficient α is divided into nine levels: 0.5, 0.53, 0.6, 0.68, 0.73, 0.8, 0.83, 0.87, and 0.9, and the fuzzy table of the membership degree function on the weight coefficient fuzzy set A is shown in table 3:

TABLE 3

(Weight Coefficient Levels and Their Fuzzy Sets)

| membership degree | | weight coefficient level | | | | | | | | |
|---|---|---|---|---|---|---|---|---|---|---|
| | | 0.5 | 0.53 | 0.6 | 0.68 | 0.73 | 0.8 | 0.83 | 0.87 | 0.9 |
| fuzzy set | $VS_\alpha$ | 1.0 | 0.5 | 0 | 0 | 0 | 0 | 0 | 0 | 0 |
| | $S_\alpha$ | 0 | 0.5 | 1.0 | 0.5 | 0 | 0 | 0 | 0 | 0 |
| | $M_\alpha$ | 0 | 0 | 0 | 0.5 | 1.0 | 0.5 | 0 | 0 | 0 |
| | $B_\alpha$ | 0 | 0 | 0 | 0 | 0 | 0.5 | 1.0 | 0.5 | 0 |
| | $VB_\alpha$ | 0 | 0 | 0 | 0 | 0 | 0 | 0 | 0.5 | 1.0 |

Assuming that the robot is currently operating at a linear velocity v=1.0 m/s, the target weight coefficient α=0.73 is calculated by a fuzzy logic optimization method, and the operating central angle of the robot calculated according to the idea of low-pass filtering is:

$$\theta=\alpha(\theta_{gi}-\theta_0)+(1-\alpha)(\theta_{1i}-\theta_0) \qquad (15)$$

The chord length and radius of the circle for the robot motion at a central angle θ are:

$$d\approx|SGi| \qquad (16)$$

$$r=(d/2)/\sin(\theta/2) \qquad (17)$$

The angular velocity of the robot at this time will be:

$$\omega=v/r \qquad (18)$$

Sending [v, ω] to the control unit robot at a certain frequency allows the robot to move along the planned trajectory.

The method for planning velocity of a mobile apparatus provided by an embodiment of the present disclosure performs robot velocity planning based on fuzzy logic and low-pass filtering, which comprehensively considers two constraints of both the target position and the target attitude, wherein the fuzzy logic is employed to optimize the low-pass filtering coefficient and the velocity of the robot is planned in real time, thereby the robot reaches the target position and the target attitude approximately, and the method can be applied to the velocity planning of any kind of forward-turn rear-drive robot.

Figure 5:
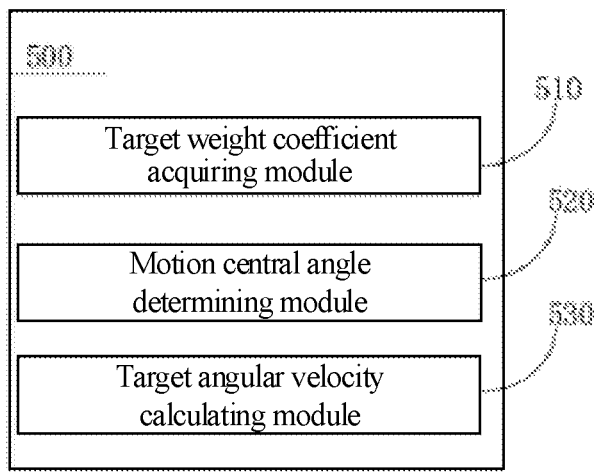
FIG. 5 is a block diagram schematically illustrating a device for planning velocity of a mobile apparatus according to an exemplary embodiment of the present disclosure.

FIG. 5 is a block diagram schematically illustrating a device for planning velocity of a mobile apparatus according to an exemplary embodiment of the present disclosure.

As shown in FIG. 5, the apparatus 500 for planning velocity of a mobile apparatus provided by an embodiment of the present disclosure may comprise a target weight coefficient acquiring module 510, a motion central angle determining module 520, and a target angular velocity calculating module 530.

The target weight coefficient acquiring module 510 may be configured to acquire the target weight coefficient according to the target linear velocity of the mobile apparatus.

The motion central angle determining module 520 may be configured to determine a motion central angle of the mobile apparatus according to a current pose, a target pose, and the target weight coefficient of the mobile apparatus.

The target angular velocity calculating module 530 may be configured to calculate a target angular velocity of the mobile Apparatus according to the motion central angle and the target linear velocity.

In an exemplary embodiment, the target weight coefficient acquiring module 510 may further comprise:

a fuzzy controller establishing sub-module that may be configured to establish a fuzzy controller for motion of the mobile apparatus;

a target linear velocity input sub-module that may be configured to input the target linear velocity to the fuzzy controller;

a target weight coefficient outputting sub-module that may be configured to output the target weight coefficient according to the target linear velocity.

In an exemplary embodiment, the fuzzy controller establishing sub-module may further comprise:

a linear velocity level and fuzzy set setting unit that may be configured to set a linear velocity level and a linear velocity fuzzy set of the mobile apparatus;

a weight coefficient level and fuzzy set setting unit that may be configured to set a weight coefficient level and a weight coefficient fuzzy set of the mobile apparatus;

a fuzzy relationship acquiring unit that may be configured to acquire a fuzzy relationship between a linear velocity membership degree and a weight coefficient membership degree, according to the linear velocity level, the linear velocity fuzzy set, the weight coefficient level, and the weight coefficient fuzzy set.

In an exemplary embodiment, the fuzzy relationship acquiring unit may further comprise:

a linear velocity membership degree function determining sub-unit that may be configured to determine a linear velocity membership degree function according to the linear velocity level and the linear velocity fuzzy set;

a weight coefficient membership degree function determining sub-unit that may be configured to determine a weight coefficient membership degree function according to the weight coefficient level and the weight coefficient fuzzy set;

a linear velocity level membership degree calculating sub-unit that may be configured to calculate, according to the linear velocity membership degree function, the linear velocity membership degree of the linear velocity level to each of elements in the linear velocity fuzzy set, respectively;

a weight coefficient level membership degree calculating sub-unit that may be configured to calculate, according to the weight coefficient membership degree function, the weight coefficient membership degree of the weight coefficient level to each of elements of the weight coefficient fuzzy set, respectively;

a fuzzy relation acquiring sub-unit that may be configured to acquire the fuzzy relationship between the linear velocity membership degree and the weight coefficient membership degree according to the linear velocity membership degree of the linear velocity level to each of the elements in the linear velocity fuzzy set and the weight coefficient membership degree of the weight coefficient level to each of the elements in the weight coefficient fuzzy set.

In an exemplary embodiment, the linear velocity fuzzy set may be $V=\{VS_v, S_v, M_v, F_v, VF_v\}$, and the weight coefficient fuzzy set may be $A=\{VS_\alpha, S_\alpha, M_\alpha, B_\alpha, VB_\alpha\}$.

In an exemplary embodiment, the fuzzy controller establishing sub-module may further comprise:

a fuzzy rule setting unit that may be configured to set a fuzzy rule according to the linear velocity fuzzy set and the weight coefficient fuzzy set as follows:

If $V=VS_v$, then $A=VS_\alpha$;
If $V=S_v$, then $A=S_\alpha$;
If $V=M_v$, then $A=M_\alpha$;
If $V=F_v$, then $A=B_\alpha$;
If $V=VF_v$, then $A=VB_\alpha$.

In an exemplary embodiment, the target weight coefficient outputting sub-module may further comprise:

a target linear velocity membership degree acquiring unit that may be configured to acquire a membership degree of the target linear velocity to the linear velocity fuzzy set according to the linear velocity membership degree function;

a target weight coefficient membership degree acquiring unit that may be configured to acquire a membership degree of the target weight coefficient according to the fuzzy relationship and the membership degree of the target linear velocity to the linear velocity fuzzy set;

a target weight coefficient acquiring unit that may be configured to defuzzy the membership degree of the target weight coefficient according to a maximum membership degree principle to acquire the target weight coefficient.

In an exemplary embodiment, the current pose may comprise a current position S and a current attitude angle $\theta_0$ of the mobile apparatus; the target pose comprises a target position G and a target attitude angle $\theta_g$ of the mobile apparatus.

In an exemplary embodiment, the motion central angle $\theta$ of the mobile apparatus may be determined according to the following formula:

$$\theta=\alpha(\theta_g-\theta_0)+(1-\alpha)(\theta_1-\theta_0)$$

In the above formula, a denotes the target weight coefficient; $\theta_1$ denotes a tangent attitude angle of a circle O and the target position G, wherein the circle O passes through both the current position S and the target position G and is tangent to the current attitude angle $\theta_0$.

In an exemplary embodiment, the target angular velocity calculating module 530 may further comprise:

a radius acquiring sub-module that may be configured to acquire a radius of a circular for the motion of the mobile apparatus according to a distance between the current position and the target position and the motion central angle;

a target angular velocity acquiring sub-module that may be configured to acquire the target angular velocity according to the radius and the target linear velocity.

In an exemplary embodiment, the apparatus 500 for planning velocity of a mobile apparatus may further comprise: a target velocity sending module that may be configured to send the target linear velocity and the target angular velocity to a control unit of the mobile apparatus at a set frequency, such that the mobile apparatus moves from the current position to the target position according to the target linear velocity and the target angular velocity.

In an exemplary embodiment, the mobile apparatus may be a forward-turn rear-drive robot.

The specific details of the above described device for planning velocity of a mobile apparatus have been described in detail in the corresponding method for planning velocity of a mobile apparatus, and therefore will not be described again here.

It should be noted that although the above exemplary embodiments describe various steps of the method in the present disclosure in a specific order, it does not imply that the steps must be performed in the specific order, or all steps must be performed to achieve the desired results. Additionally or alternatively, certain steps may be omitted, multiple steps may be combined into one step for execution, and/or one step may be divided into multiple steps for execution, or the like.

It should be noted that although a number of modules or sub-modules or units or sub-units of a apparatus for action execution are mentioned in the above detailed description, such division is not compulsory. Indeed, in accordance with embodiments of the present disclosure, the features and functions of two or more modules or sub-modules or units or sub-units described above may be embodied in one module or sub-module or unit or sub-unit. Conversely, the features and functions of one module or sub-module or unit or sub-unit described above may be further divided into multiple modules or sub-modules or units or sub-units to be embodied.

In an exemplary embodiment of the present disclosure, there is also provided a computer readable storage medium having stored thereon a computer program, when executed by a processor, the computer program implements the above-described method for planning velocity of a mobile apparatus. In some possible implementations, various aspects of the present disclosure may also be implemented in the form of a program product including program code; the program product may be stored a non-volatile storage medium (which may be a CD-ROM, USB disk or mobile hard disk or the like) or on a network; when the program product is run on a computing apparatus (which may be a personal computer, a server, a terminal device, or a network apparatus, etc.), the program code enables the computing apparatus to perform steps of the method in the various exemplary embodiments described above in this disclosure.

Figure 6:
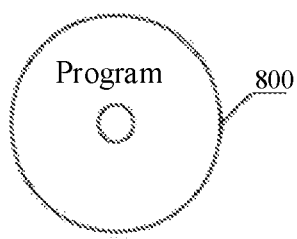
FIG. 6 is a diagram schematically illustrating a program product according to an exemplary embodiment of the present disclosure.

Referring to FIG. 6, a program product 800 for implementing the above method according to an embodiment of the present disclosure may employ a portable compact disk read only memory (CD-ROM) and comprise program code, and may be run in a computing apparatus (for example, a personal computer, a server, a terminal device, or a network apparatus, etc.). However, the program product of the present disclosure is not limited thereto. In the exemplary embodiment, the computer readable storage medium may be any tangible medium that can contain or store a program, which can be used by or in connection with an instruction execution system, device, or component.

The program product may employ any combination of one or more readable mediums. The readable medium may be a readable signal medium or a readable storage medium.

The readable storage medium may be, for example, but not limited to, an electronic, magnetic, optical, electromagnetic, infrared, or semiconductor system, device, or component, or any combination of the above. More specific examples (non-exhaustive lists) of the readable storage medium comprise: electrical connection with one or more wires, portable disk, hard disk, random access memory (RAM), read only memory (ROM), erasable Programmable read-only memory (EPROM or flash memory), optical fiber, portable compact disk read only memory (CD-ROM), optical storage component, magnetic storage component, or any suitable combination of the foregoing.

The readable signal medium may comprise a data signal that is propagated in baseband or as part of a carrier, in which readable program code is carried. Such propagated data signals can take a variety of forms including, but not limited to, electromagnetic signal, optical signal, or any suitable combination of the foregoing. The readable signal medium may also be any readable medium other than a readable storage medium, the readable medium may send, propagate or transmit a program that is used by or in connection with an instruction execution system, device, or component.

The program code embodied on the readable medium can be transmitted by any suitable medium, including but not limited to wireless, wired, optical cable, RF, etc., or any suitable combination of the foregoing.

Program code for performing the operations of the present disclosure may be written in any combination of one or more programming languages, including object oriented programming language, such as Java, C++, etc., and including conventional procedural programming language, such as C language or similar programming language. The program code may be executed entirely on a user computing apparatus, partially on a user computing apparatus, as a stand-alone software package, partially on a user computing apparatus and partially on a remote computing apparatus, or entirely on a remote computing apparatus or on a server. In the case of a remote computing apparatus, the remote computing device may be connected to the user computing apparatus via any kind of network, including a local area network (LAN) or wide area network (WAN), or may be connected to an external computing apparatus, such as utilizing an Internet service provider.

In an exemplary embodiment of the present disclosure, there is also provided an electronic apparatus comprising at least one processor and at least one memory for storing executable instructions of the processor; wherein the processor is configured to perform steps of the method in the various exemplary embodiments described above in this disclosure via execution of the executable instructions.

An electronic apparatus 900 in the present exemplary embodiment will be described below with reference to FIG. 7. The electronic apparatus 900 is merely an example and should not impose any limitation on the function and scope of use of the embodiments of the present disclosure.

Figure 7:
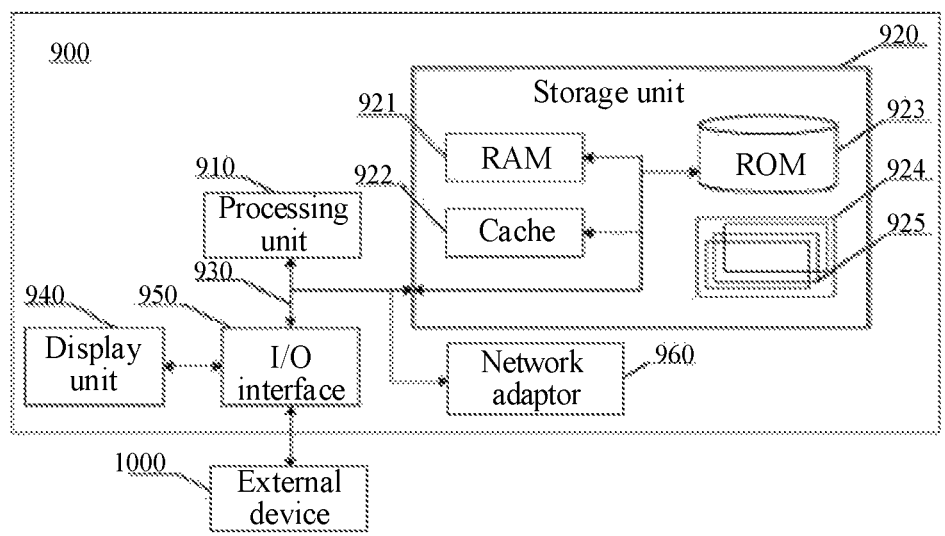
FIG. 7 is a diagram schematically illustrating an electronic device according to an exemplary embodiment of the present disclosure.

Referring to FIG. 7, the electronic apparatus 900 is represented in the form of a general purpose computing apparatus. The components of the electronic device 900 may comprise, but are not limited to, at least one processing unit 910, at least one storage unit 920, a bus 930 connecting different system components (including the processing unit 910 and the storage unit 920), and a display unit 940.

Wherein, the storage unit 920 stores program code, which can be executed by the processing unit 910, such that the processing unit 910 performs steps of the method in the various exemplary embodiments described above in this disclosure.

The storage unit 920 may comprise a readable medium in the form of a volatile storage unit, such as a random access storage unit (RAM) and/or a cache storage unit 922, and may further comprise a read only storage unit 923 (ROM).

The storage unit 920 may also comprise a program/utility 924 having a set (at least one) of program modules 925, such program modules including but not limited to: an operating system, one or more applications, other program modules, and program data, each of these examples or some combination may comprise an implementation in a network environment.

The bus 930 may be representative of one or more of several types of bus structures, including a memory unit bus or memory unit controller, a peripheral bus, a graphics acceleration port, a processing unit, or a local bus of any bus structure.

The electronic apparatus 900 can also be in communication with one or more external apparatus 1000 (e.g., a keyboard, pointing apparatus, Bluetooth apparatus, etc.), and can also communicate with one or more apparatus that enable a user to interact with the electronic apparatus 900, and/or communicate with any apparatus (e.g., router, modem, etc.) that enables the electronic apparatus 900 to communicate with one or more other computing apparatus. This communication can take place via an input/output (I/O) interface 950. Also, the electronic apparatus 900 can communicate with one or more networks (e.g., a local area network (LAN), a wide area network (WAN), and/or a public network, such as the Internet) through a network adapter 960. As shown in FIG. 7, the network adapter 960 can communicate with other modules of electronic apparatus 900 via the bus 930. It will be understood that although not shown in the figures, other hardware and/or software modules may be utilized in conjunction with the electronic apparatus 900, including but not limited to: microcode, apparatus driver, redundant processing unit, external disk drive array, RAID system, tape drive, and data backup storage systems, etc.

Those skilled in the art will appreciate that aspects of the present disclosure may be implemented as a system, method, or program product. Accordingly, aspects of the present disclosure may be embodied in the following forms: a complete hardware implementation, a complete software implementation (including firmware, microcode, etc.), or a combination of hardware and software, which may be collectively referred to herein as 'circuit', 'module' or 'system'.

Other embodiments of the present disclosure will be readily apparent to those skilled in the art after learning the present specification and practicing the disclosed invention herein. The present application is intended to cover any variations, uses, or adaptations of the present disclosure, which are in accordance with the general principles of the present disclosure and comprise common general knowledge or common technical means in the art that are not disclosed in the present disclosure. The specification and examples are to be considered as illustrative only and the real scope and spirit of the present disclosure are pointed out by the attached claims.

The features, structures, or characteristics described above may be combined in any suitable manner in one or more embodiments, and the features discussed in the various embodiments are interchangeable, if possible. In the description above, numerous specific details are set forth to provide a throughout understanding to the embodiments of the present disclosure. However, those skilled in the art will appreciate that the technical solutions of the present disclosure may be practiced without one or more of the specific details, or other methods, components, materials, and the like may be employed. In other instances, well-known structures, materials or operations are not shown or described in detail to avoid obscuring aspects of the present disclosure.

What is claimed is:

1. A method for controlling a mobile apparatus, at a computing apparatus, comprising:
    acquiring a target weight coefficient according to a target linear velocity of the mobile apparatus;
    determining a motion central angle of the mobile apparatus according to a current pose, a target pose, and the target weight coefficient of the mobile apparatus;
    calculating a target angular velocity of the mobile apparatus according to the motion central angle and the target linear velocity; and
    controlling the mobile apparatus to move from a current position to a target position according to the target linear velocity and the target angular velocity by sending the target linear velocity and the target angular velocity to a control unit of the mobile apparatus.

2. The method according to claim 1, wherein the acquiring a target weight coefficient according to a target linear velocity of the mobile apparatus comprises:
    establishing a fuzzy controller for motion of the mobile apparatus;
    inputting the target linear velocity to the fuzzy controller; and
    outputting the target weight coefficient by the fuzzy controller according to the target linear velocity.

3. The method according to claim 2, wherein the establishing a fuzzy controller for motion of the mobile apparatus comprises:
    setting a linear velocity level and a linear velocity fuzzy set of the mobile apparatus;
    setting a weight coefficient level and a weight coefficient fuzzy set of the mobile apparatus; and
    acquiring a fuzzy relationship between a linear velocity membership degree and a weight coefficient membership degree, according to the linear velocity level, the linear velocity fuzzy set, the weight coefficient level, and the weight coefficient fuzzy set.

4. The method according to claim 3, wherein the acquiring a fuzzy relationship between a linear velocity membership degree and a weight coefficient membership degree, according to the linear velocity level, the linear velocity fuzzy set, the weight coefficient level, and the weight coefficient fuzzy set comprises:
    determining a linear velocity membership degree function according to the linear velocity level and the linear velocity fuzzy set;
    determining a weight coefficient membership degree function according to the weight coefficient level and the weight coefficient fuzzy set;
    calculating, according to the linear velocity membership degree function, the linear velocity membership degree of the linear velocity level to each of elements of the linear velocity fuzzy set, respectively;
    calculating, according to the weight coefficient membership degree function, the weight coefficient membership degree of the weight coefficient level to each of elements of the weight coefficient fuzzy set, respectively; and
    acquiring the fuzzy relationship between the linear velocity membership degree and the weight coefficient membership degree, according to the linear velocity membership degree of the linear velocity level to each of the elements of the linear velocity fuzzy set and the weight coefficient membership degree of the weight coefficient level to each of the elements of the weight coefficient fuzzy set.

5. The method according to claim 4, wherein the linear velocity fuzzy set is represented by $V=\{VS_v, S_v, M_v, F_v, VF_v\}$, the weight coefficient fuzzy set is represented by $A=\{VS_\alpha, S_\alpha, M_\alpha, B_\alpha, VB_\alpha\}$; and the establishing a fuzzy controller for motion of the mobile apparatus further comprises:
    making a fuzzy rule according to the linear velocity fuzzy set and the weight coefficient fuzzy set as follows:
    If $V=VS_v$, then $A=VS_\alpha$;
    If $V=S_v$, then $A=S_\alpha$;
    If $V=M_v$, then $A=M_\alpha$;
    If $V=F_v$, then $A=B_\alpha$;
    If $V=VF_v$, then $A=VB_\alpha$.

6. The method according to claim 4, wherein the outputting the target weight coefficient by the fuzzy controller according to the target linear velocity comprises:
    acquiring a membership degree of the target linear velocity to the linear velocity fuzzy set according to the linear velocity membership degree function;
    acquiring a membership degree of the target weight coefficient according to the fuzzy relationship and the membership degree of the target linear velocity to the linear velocity fuzzy set; and
    defuzzying the membership degree of the target weight coefficient according to a maximum membership degree principle to acquire the target weight coefficient.

7. The method according to claim 1, wherein the current pose comprises a current position S and a current attitude angle $\theta_0$ of the mobile apparatus; the target pose comprises a target position G and a target attitude angle $\theta_g$ of the mobile apparatus.

8. The method according to claim 7, wherein the motion central angle $\theta$ of the mobile apparatus is determined according to the following formula:

$$\theta=\alpha(\theta_g-\theta_0)+(1-\alpha)(\theta_1-\theta_0)$$

wherein, $\alpha$ denotes the target weight coefficient; $\theta_1$ denotes a tangent attitude angle of a circle O and the target position G, wherein the circle O passes through both the current position S and the target position G and is tangent to the current attitude angle $\theta_0$.

9. The method according to claim 8, wherein the calculating a target angular velocity of the mobile apparatus according to the motion central angle and the target linear velocity comprises:

acquiring a radius of a circle of the motion of the mobile apparatus according to the motion central angle and a distance between the current position and the target position; and acquiring the target angular velocity according to the radius and the target linear velocity.

10. The method according to claim 1, further comprises:

sending the target linear velocity and the target angular velocity to the control unit of the mobile apparatus at a set frequency.

11. The method according to claim 1, wherein the mobile apparatus is a forward-turn rear-drive robot.

12. A non-transitory computer readable storage medium having stored thereon a computer program, when being executed by a processor, the computer program implements the method for controlling a mobile apparatus, the method comprising:

acquiring a target weight coefficient according to a target linear velocity of the mobile apparatus;

determining a motion central angle of the mobile apparatus according to a current pose, a target pose, and the target weight coefficient of the mobile apparatus;

calculating a target angular velocity of the mobile apparatus according to the motion central angle and the target linear velocity; and controlling the mobile apparatus to move from a current position to a target position according to the target linear velocity and the target angular velocity by sending the target linear velocity and the target angular velocity to a control unit of the mobile apparatus.

13. An electronic device, comprising:

at least one processor;

a memory communicatively coupled to the at least one processor:

wherein the memory stores instructions which, when executed by the at least one processor, causes the at least one processor to:

acquiring a target weight coefficient according to a target linear velocity of the mobile apparatus;

determining a motion central angle of the mobile apparatus according to a current pose, a target pose, and the target weight coefficient of the mobile apparatus;

calculating a target angular velocity of the mobile apparatus according to the motion central angle and the target linear velocity; and controlling the mobile apparatus to move from a current position to a target position according to the target linear velocity and the target angular velocity by sending the target linear velocity and the target angular velocity to a control unit of the mobile apparatus.

14. The electronic device according to claim 13, wherein the acquiring a target weight coefficient according to a target linear velocity of the mobile apparatus comprises:

establishing a fuzzy controller for motion of the mobile apparatus;

inputting the target linear velocity to the fuzzy controller; and outputting the target weight coefficient by the fuzzy controller according to the target linear velocity.

15. The electronic device according to claim 14, wherein the establishing a fuzzy controller for motion of the mobile apparatus comprises:

setting a linear velocity level and a linear velocity fuzzy set of the mobile apparatus;

setting a weight coefficient level and a weight coefficient fuzzy set of the mobile apparatus; and acquiring a fuzzy relationship between a linear velocity membership degree and a weight coefficient membership degree, according to the linear velocity level, the linear velocity fuzzy set, the weight coefficient level, and the weight coefficient fuzzy set.

16. The electronic device according to claim 15, wherein the acquiring a fuzzy relationship between a linear velocity membership degree and a weight coefficient membership degree, according to the linear velocity level, the linear velocity fuzzy set, the weight coefficient level, and the weight coefficient fuzzy set comprises:

determining a linear velocity membership degree function according to the linear velocity level and the linear velocity fuzzy set;

determining a weight coefficient membership degree function according to the weight coefficient level and the weight coefficient fuzzy set;

calculating, according to the linear velocity membership degree function, the linear velocity membership degree of the linear velocity level to each of elements of the linear velocity fuzzy set, respectively;

calculating, according to the weight coefficient membership degree function, the weight coefficient membership degree of the weight coefficient level to each of elements of the weight coefficient fuzzy set, respectively; and acquiring the fuzzy relationship between the linear velocity membership degree and the weight coefficient membership degree, according to the linear velocity membership degree of the linear velocity level to each of the elements of the linear velocity fuzzy set and the weight coefficient membership degree of the weight coefficient level to each of the elements of the weight coefficient fuzzy set.

17. The electronic device according to claim 16, wherein the outputting the target weight coefficient by the fuzzy controller according to the target linear velocity comprises:

acquiring a membership degree of the target linear velocity to the linear velocity fuzzy set according to the linear velocity membership degree function;

acquiring a membership degree of the target weight coefficient according to the fuzzy relationship and the membership degree of the target linear velocity to the linear velocity fuzzy set; and defuzzying the membership degree of the target weight coefficient according to a maximum membership degree principle to acquire the target weight coefficient.

18. The electronic device according to claim 13, wherein the current pose comprises a current position S and a current attitude angle $\theta_0$ of the mobile apparatus; the target pose comprises a target position G and a target attitude angle $\theta_g$ of the mobile apparatus.

19. The electronic device according to claim 18, wherein the motion central angle $\theta$ of the mobile apparatus is determined according to the following formula:

$$\theta=\alpha(\theta_g-\theta_0)+(1-\alpha)(\theta_1-\theta_0)$$

wherein, $\alpha$ denotes the target weight coefficient; $\theta_1$ denotes a tangent attitude angle of a circle O and the target position G, wherein the circle O passes through both the current position S and the target position G and is tangent to the current attitude angle $\theta_0$.

20. The electronic device according to claim 19, wherein the calculating a target angular velocity of the mobile apparatus according to the motion central angle and the target linear velocity comprises:
- acquiring a radius of a circle of the motion of the mobile apparatus according to the motion central angle and a distance between the current position and the target position; and
- acquiring the target angular velocity according to the radius and the target linear velocity.

* * * * *